C. GROVE.
ARTIFICIAL BAIT.
APPLICATION FILED JULY 10, 1909.

970,216.

Patented Sept. 13, 1910.

UNITED STATES PATENT OFFICE.

CLYDE GROVE, OF WARREN, OHIO.

ARTIFICIAL BAIT.

970,216.  Specification of Letters Patent.  Patented Sept. 13, 1910.

Application filed July 10, 1909. Serial No. 506,910.

*To all whom it may concern:*

Be it known that I, CLYDE GROVE, a citizen of the United States, residing at Warren, in the county of Trumbull and State of Ohio, have invented certain new and useful Improvements in Artificial Baits, of which the following is a specification.

My invention relates to an improvement in artificial fishing bait, and the object is to provide the bait in the form of a minnow, which is provided with the necessary hooks for attracting the fish as the minnow is drawn through the water in trolling.

The invention consists of certain novel features of construction and combinations of parts, which will be hereinafter fully described and pointed out in the claims.

Figure 1:
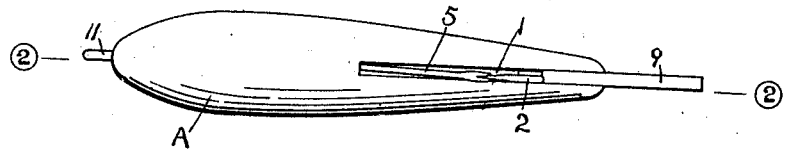
Figure 2:
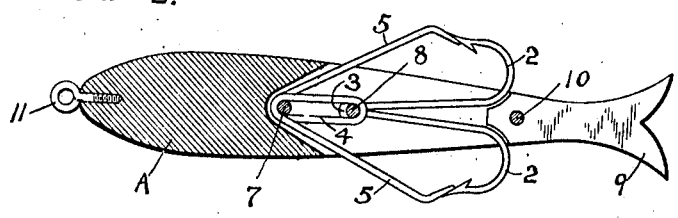
Figure 3:
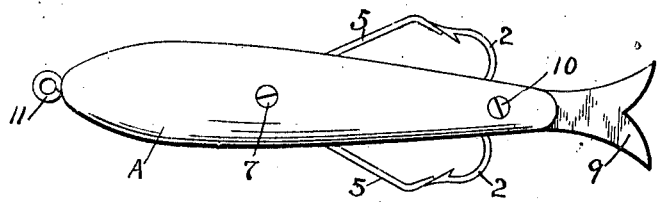

In the accompanying drawings: Figure 1 is a top plan view; Fig. 2 is a longitudinal sectional view; and Fig. 3 is a longitudinal vertical view.

A represents the minnow, preferably made of wood, which is split or bifurcated as at 1. The hooks 2, 2 are held between the bifurcated members by a screw 8 or other means passing through the eye 3 formed at the upper ends of the shanks of the hooks. This connection allows the hooks to spring toward one another slightly. A guard located in the slot forming the bifurcated portion is composed of a shank 4 and arms 5, 5, which project toward the free ends of the hooks and the outer ends of the arms are bent inwardly or diagonally so that they extend along the inner surface of the hooks 2 and form a guard to prevent weeds or other foreign matter from catching on the hooks. The guard is made preferably of a single piece of metal and its center shank is preferably in the form of a loop and is held by a screw 7 passing through the loop. The shank 4 extends beneath the shanks of the hooks 2 and the screw 8 which passes through the eye 3 passes also through the loop of shank 4. This connection prevents the guard from moving out of position. The arms, however, are more resilient than the hook members 2, and are capable of being compressed inwardly toward the minnow very easily so that there is no danger of the guards preventing hooking a fish. A tail 9, is held between the bifurcated members by a screw 10. The tail is preferably made of elastic or flexible material, preferably rubber, so that it will be capable of movement as the minnow is drawn through the water. An eyelet 11, is connected to the minnow to which the line can be connected.

From the foregoing, it will be seen that I have provided a novel means of attaching the hooks and guard to an artificial bait and that the flexible tail will give the action of a small minnow or fish swimming through the water.

Having fully described my invention, what I claim as new and desire to secure by Letters Patent, is:

1. An artificial bait comprising a body portion split at one end, and a hook, tail, and guard, all held and partially housed in the slit of the split end of the body portion.

2. An artificial bait comprising a body portion having a slot in one end whereby it is split, a guard comprising a shank, and arm, and a hook and means extending through the shank for holding the guard and hook within the slot.

3. An artificial bait comprising a bifurcated body, hooks held in the bifurcated portion and a guard having spring arms held in the bifurcated portion of the body.

4. An artificial bait comprising a bifurcated body, a guard received in the bifurcation, hooks received in the bifurcation, and means passing through the bifurcation connecting the guard and hooks together and connecting them to the bifurcated body.

5. An artificial bait comprising a bifurcated body, hooks received in the bifurcated portion, a guard for the hooks comprising a loop, means connecting the guard and hooks together and connecting them to the body, and arms connected to the loop adapted to engage the hooks.

In testimony whereof I affix my signature, in the presence of two witnesses.

CLYDE GROVE.

Witnesses:
C. H. HERNER,
C. W. WAGAR.